April 7, 1931. D. M. WATSON ET AL 1,799,659
HAND TRUCK
Filed April 3, 1928
FIG. I.
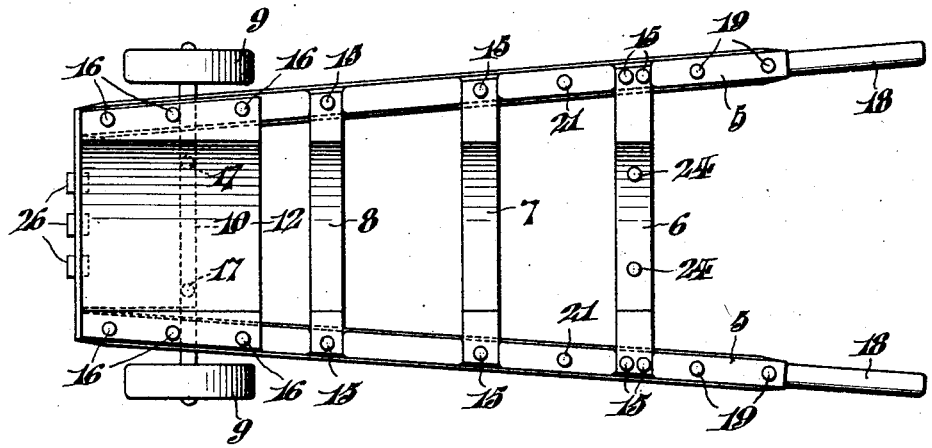
FIG. II.
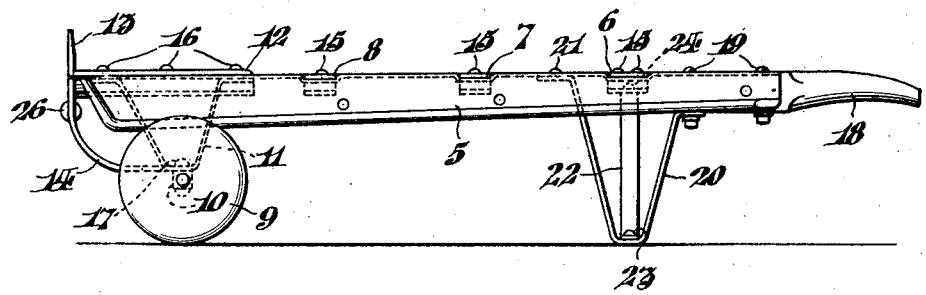
FIG. III.
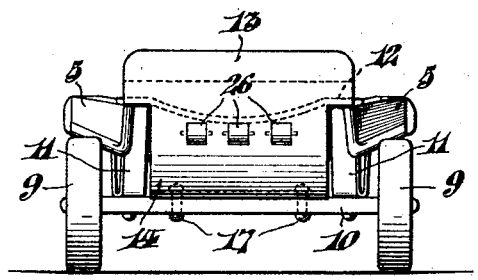
WITNESSES
John A. Weidler
William Bell
INVENTORS:
David M. Watson &
Gonzalo C. Munoz,
BY Foley Paul
ATTORNEYS.

Patented Apr. 7, 1931

1,799,659

UNITED STATES PATENT OFFICE

DAVID M. WATSON, OF ELKINS PARK, AND GONZALO C. MUNOZ, OF PHILADELPHIA, PENNSYLVANIA, ASSIGNORS TO THE AMERICAN PULLEY COMPANY, OF PHILADELPHIA, PENNSYLVANIA, A CORPORATION OF PENNSYLVANIA

HAND TRUCK

Application filed April 3, 1928. Serial No. 266,961.

Our invention relates to hand trucks. In suitable forms of embodiment, such as here shown and described, it is very useful and advantageous for handling rolls of paper and other similar objects or bundles. As here shown, it affords a convenient, rugged, and relatively inexpensive construction for such purposes.

In the drawings, Fig. I is a plan view of a hand truck conveniently embodying the invention.

Fig. II shows a side view of the truck.

Fig. III shows an endwise view, from the left of Figs. I and II.

The truck here shown comprises a frame of longitudinal side members or sills 5, 5 and transverse members 6, 7, 8. The truck wheels 9, 9 are mounted on a transverse axle 10 attached to brackets 11, 11 at the forward end of the truck. Between the side members 5, 5 extends a bottom plate 12, concaved lengthwise of the truck to substantially the same curvature as the transverse members 6, 7, 8. At the forward end of the truck is an upstanding toe 13 tapered or bevelled for easy insertion under an object to be handled on the truck, and a curved structure 14 for the truck to rock on when lifting the load, or vice-versa.

As here shown, the sills 5, 5 are of channeled sheet metal construction, and beaded along their lower edges for reinforcement. The upper surfaces of the webs of these channels are recessed, as shown in Figs. I and II, to take the ends of the transverse members 6, 7, 8, which are secured to them by rivets 15. The brackets 11 for the axle 10 are of strap iron bent to a V-shape. Their ends extend up into the channel side members 5, 5 and are secured to the channel webs by two of the rivets 16 which serve to secure each end of the bottom plate 12 to the top surfaces of the side members. The toe 13 and the rocker 14 are formed by a plate whose edge overlaps the axle 10 and is secured thereto by rivets 17; this plate extends from the axle forward and upward on a well-rounded curve above the plate 12, as already mentioned. As will be seen from Fig. III, the cylindrically bent plate 14 extends substantially all the way across the front of the truck, between its side members 5, 5 and their brackets 11, 11. The forward edge of the plate 12 is preferably welded to the side of the plate 13, 14. This may be done by an arc-welding method, the joint being formed at the lower side of the plate 12 except at the sides, over the ends of the sills 5, 5, and there formed at the upper side of said plate 12.

As shown in Figs. I and II there are wooden handles 18, 18 fitted in the rear ends of the side members 5, 5, each secured by vertical bolts 19, 19 through the channel webs. Feet 20, 20 (of strap iron bent to an unequal legged V-shape) extend downward from the side members 5, 5 adjacent the handles 18, 18, being secured by two of the handle bolts 19 and by rivets 21 through the channel webs. These feet 20, 20 are braced by a transverse strap-bar member 22 whose ends are secured to the bends of the feet by rivets 23, 23, and whose intermediate portion is secured to the transverse member 6 by rivets 24, 24.

As shown in the drawings, a series of rollers 26 are mounted in openings in the plate 13, 14, about at the beginning of the rocker curvature, with their axes or pintles parallel with the axle 10. These rollers 26 facilitate working the toe 13 under the end of an upstanding roll of paper.

From this description, it will be seen that the truck is strong, rugged, and of very simple construction, so as to be relatively inexpensive to manufacture. It can be easily loaded with round objects (such as a roll of paper) by tipping it upright from the position shown in Fig. II, allowing it to rock upward on the rocker structure 14 until the toe 13 touches the floor and can be slipped under the end of the upstanding paper roll. The rocker 14 then affords favorable leverage for lifting the roll and tilting it back with the truck, so that the weight shall be approximately balanced over the axle 10. In unloading, the truck with its load are easily tipped forward to allow the latter to rest on the ground, and the truck then disengaged.

Having thus described our invention, we claim:

1. A hand truck of the character described, comprising a frame with longitudinal side members, and load sustaining means between said side members; a transverse axle attached to said side members at one end, with wheels on said axle; and a rocker plate attached to said axle between said wheels, extending substantially all the way across the front of the truck between said side members, and bent in a cylindrical curve forward and upward to afford a toe extending above them; so that the truck may be rocked forward on said rocker plate, and thereby lifted off its wheels.

2. A hand truck of the character described, comprising a frame with longitudinal side members; a transverse axle beneath said side members, and brackets extending downward from said side members to carry said axle; wheels on said axle; a recessed bottom plate extending across the space between said side members over said axle; an apertured rocker plate attached to said axle between said brackets, bent in a cylindrical curve forward and upward and extending above said bottom plate; and rollers located and mounted in the plate apertures in the upward extending portion of the plate; so that the truck may be rocked upward and forward on said rocker plate, and manipulated in an upright position on said rollers.

In testimony whereof, we have hereunto signed our names at Philadelphia, Pa., this 28th day of March, 1928.

DAVID M. WATSON.
GONZALO C. MUNOZ.